US008823946B1

(12) United States Patent
Logan, Jr. et al.

(10) Patent No.: US 8,823,946 B1
(45) Date of Patent: Sep. 2, 2014

(54) MULTI-AXIS FIBER OPTIC GYROSCOPE WITH SINGLE LIGHT SOURCE

(75) Inventors: Ronald T. Logan, Jr., Pasadena, CA (US); Ka Kha Wong, Alhambra, CA (US)

(73) Assignee: Emcore Corporation, Albuquerque, NM (US)

( * ) Notice: Subject to any disclaimer, the term of this patent is extended or adjusted under 35 U.S.C. 154(b) by 512 days.

(21) Appl. No.: 13/158,865

(22) Filed: Jun. 13, 2011

(51) Int. Cl.
*G01C 19/66* (2006.01)
*G01C 19/72* (2006.01)
*G01B 9/02* (2006.01)
*G01C 19/64* (2006.01)

(52) U.S. Cl.
CPC ............... *G01C 19/72* (2013.01); *G01C 19/64* (2013.01)
USPC ........................... 356/462; 356/471; 356/478

(58) Field of Classification Search
USPC .......................................... 356/462, 471, 478
See application file for complete search history.

(56) References Cited

U.S. PATENT DOCUMENTS

| | | | |
|---|---|---|---|
| 5,677,767 A | 10/1997 | Shirasaki et al. | |
| 5,719,674 A * | 2/1998 | Martin et al. | 356/462 |
| 5,818,589 A * | 10/1998 | Scholz et al. | 356/462 |
| 6,034,924 A | 3/2000 | Vakoc | |
| 6,278,657 B1 | 8/2001 | Vakoc | |
| 6,377,391 B1 | 4/2002 | Vakoc et al. | |
| 6,466,364 B1 | 10/2002 | Vakoc et al. | |
| 6,529,444 B2 | 3/2003 | Vakoc | |
| 6,667,935 B2 | 12/2003 | Vakoc | |
| 6,678,211 B2 | 1/2004 | Vakoc | |
| 7,417,740 B2 * | 8/2008 | Alphonse et al. | 356/479 |
| 7,746,476 B2 | 6/2010 | Demers et al. | |
| 2002/0097636 A1 | 7/2002 | Vakoc | |
| 2002/0145795 A1 | 10/2002 | Vakoc et al. | |
| 2002/0191937 A1 * | 12/2002 | Knox et al. | 385/135 |
| 2003/0043696 A1 | 3/2003 | Vakoc | |
| 2003/0043697 A1 * | 3/2003 | Vakoc | 367/149 |
| 2009/0015843 A1 * | 1/2009 | Demers et al. | 356/462 |
| 2011/0037972 A1 * | 2/2011 | Bergh | 356/73.1 |

* cited by examiner

*Primary Examiner* — Tarifur Chowdhury
*Assistant Examiner* — Sunghee Y Gray

(57) ABSTRACT

A fiber optic gyroscope including a non-coherent light source for producing a first beam of light, an optical circulator in the path of said first beam for providing polarized second and third beams, respectively, with polarization orthogonal to each other, and a time division multiplexer in the path of the second and third beams. A first planar optical fiber loop is coupled to the time division multiplexer and has a first end and a second end coupled to the second and third beams respectively during a first time period. A second planar optical fiber loop is coupled to the time division multiplexer and has a first end and a second end coupled to the second and third beams respectively during a second time period subsequent to the first time period.

16 Claims, 5 Drawing Sheets

MULTI-AXIS FIBER OPTIC GYROSCOPE WITH SINGLE LIGHT SOURCE

REFERENCE TO RELATED APPLICATIONS

This application is related to U.S. patent application Ser. No. 13/078,428, filed on Apr. 1, 2011.

BACKGROUND OF THE INVENTION

1. Field of the Invention

The invention relates to fiber optic gyroscopes (FOGs) and in particular to integration techniques that utilize only a single light source to implement a multi-axis FOG transceiver in a small, compact form factor.

2. Description of the Related Art

A FOG is a device that uses the propagation of light beams in an optical fiber coil to detect mechanical rotation of the fiber coil. The sensor is a coil of as much as 5 km of optical fiber. The typical implementation provides that two light beams be launched into the fiber in opposite directions. Due to an optical phenomenon known as the Sagnac effect, the beam traveling against the rotation experiences a slightly shorter path than the other beam, resulting in a relative phase shift. The amount of the phase shift of the original two beams can be measured by determining how the beams interfere with each other when they are combined. The intensity of the combined beam then depends on the rotation rate of the fiber coil about its axis.

A FOG provides extremely precise rotational rate information, in view of its lack of cross-axis sensitivity to vibration, acceleration, and shock. Unlike the classic spinning-mass gyroscope, the FOG has virtually no moving parts and no inertial resistance to movement. The FOG also provides a higher resolution than a ring laser gyroscope and is utilized in internal navigation systems requiring a high degree of accuracy.

There are two types of FOG systems, closed loop and open loop. In a closed loop system, a feedback path is defined so as to maintain the phase difference between the light beams constant after the beams exit the ends of the fiber coil. The amount of feedback needed to maintain the fixed phase relation is therefore indicative of the rate of rotation of the coil about its axis.

Open loop FOG systems calculate the rotation rate by way of amplitude measurements taken along an interference curve which results when the two exiting light beams are recombined.

SUMMARY OF THE INVENTION

1. Objects of the Invention

It is an object of the present invention to provide a fiber optic gyroscope in a small, highly integrated form factor.

It is another object of the present invention to provide a multi-axis fiber optic gyroscope in a compact configuration.

It is also another object of the present invention to provide a multi-axis fiber optic gyroscope using only a single light source.

It is still another object of the present invention to provide a multi-axis fiber optic gyroscope using only a single phase modulator.

Some implementations may achieve fewer than all of the foregoing objects.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications modifications and embodiments in other fields, which are within the scope of the invention as disclosed and claimed herein and with respect to which the invention could be of utility.

2. Features of the Invention

Briefly, and in general terms, the present invention provides a fiber optic gyroscope (FOG) subassembly including a non-coherent light source for producing a first beam of light and an optical subassembly in the path of the first beam for providing polarized second and third beams, respectively, with polarization orthogonal to each other. The FOG subassembly further includes a time division multiplexer in the path of the second beam, and a photodetector in the path of the third beam. The time division multiplexer outputs are each connected to an optical phase modulator with a single input and dual outputs. A first planar optical fiber loop is coupled to the outputs of the first optical phase modulator, and other planar optical fiber loops are coupled to the outputs of the other optical phase modulators in like manner. The optical phase modulators and plural optical fiber loops are intermittently connected to the optical subassembly output at different time periods, via control of the time division multiplexer. In one implementation, the switching is sequential, with the first loop illuminated in a first time period and the second and subsequent planar optical fiber loops illuminated respectively during a second and subsequent time periods subsequent to the first time period.

The optical subassembly may include an optical circulator.

The optical circulator may include a polarizing beam splitter.

The time-division multiplexer may be a planar integrated optical switch.

The planar optical fiber loop may be circumferentially disposed around the interior periphery of the first housing.

The phase modulators may be lithium niobate modulators.

The phase modulators may be monolithically integrated on the same substrate with the time-division multiplexing element.

The polarizing beam splitter can direct the S polarization of the initial beam of light from the incoherent source through and into the Faraday rotator.

The optical circulator can further include a Faraday rotator coupled to an output of the polarizing beam splitter.

The polarizing beam splitter can direct the P polarization of the initial beam of light from the incoherent source onto a power monitoring photodiode.

The polarizing beam splitter directs the return light of the P polarization to the photodetector.

The optical circulator can include a Faraday rotator, and the polarizing beam splitter can couple the light of S polarization to the Faraday rotator.

A monitor photodiode can be coupled to the polarizing beam splitter for monitoring the light of P polarization from the light source.

In another aspect of the disclosure, the present disclosure provides a fiber optic gyroscope (FOG) subassembly that includes a non-coherent light source for producing a first beam of light and an optical circulator having a first port coupled to the non-coherent light source first beam of light, a second port and a third port coupled to a polarization-maintaining optical fiber. The second port transmits substantially the entire first beam of light in one direction to the polarization-maintaining optical fiber, and light coming in the opposite direction in the polarization-maintaining fiber is directed to the third port. The FOG subassembly further includes a photodetector coupled to the third port of the circulator for receiving the light and converting the light to an electrical signal, a time division multiplexer in the path of the second beam producing a plurality of beams at subsequent time periods, the multiplexer having at least first and second outputs for transmitting the second beam to a different output at periodic time intervals, at least first and second optical phase modulators coupled to the at least first and second outputs respectively of the time division multiplexer, and at least first and second planar optical fiber loops coupled to the outputs of the first and second optical phase modulators respectively.

In yet another aspect of the disclosure, the present disclosure provides a transceiver subassembly for a fiber optic gyroscope that includes a housing, a non-coherent light source for producing a first beam of light disposed in the housing, a beam splitter disposed in the housing and disposed in the path of the first beam of light for producing a second and a third beam respectively, a monitor photodiode disposed in the housing and disposed in the path of the second beam to monitor the intensity of the second beam, an optical circulator disposed in the housing and disposed in the path of the third beam for providing polarized third and fourth beams respectively, with polarization orthogonal to each other, and first and second photodiodes disposed in the second housing and coupled to the optical circulator for receiving the optical signal from fifth and sixth return beams.

The housing of the transceiver subassembly can be a hermetically sealed butterfly package.

Some implementations of the present invention may incorporate or implement fewer of the aspects and features noted in the foregoing summaries.

BRIEF DESCRIPTION OF THE DRAWINGS

These and other features and advantages of this invention will be better understood and more fully appreciated by reference to the following detailed description when considered in conjunction with the accompanying drawings wherein.

Figure 1:
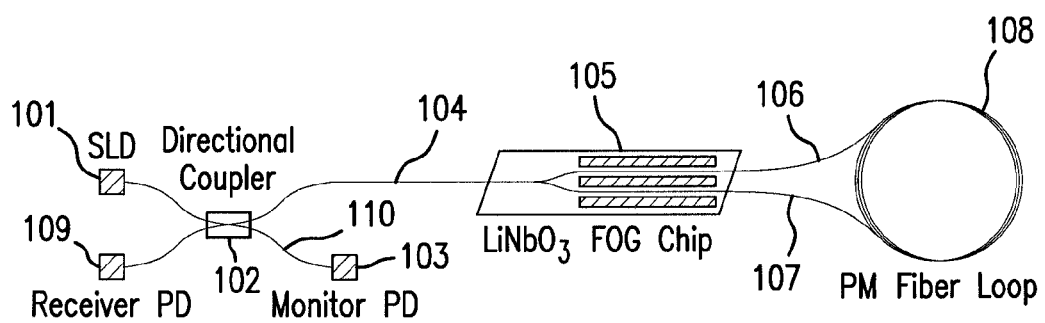
FIG. 1 is a highly simplified block diagram of a prior art single-axis fiber optic gyroscope.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

FIG. 1 depicts a highly simplified diagram of a single-axis Fiber Optic Gyroscope (FOG) transceiver subassembly as is known in the prior art. The diagram shows a fiber-coupled broadband source, e.g. a super luminescent diode (SLD) 101 for producing a non-coherent beam of light, and a directional coupler 102 in the path of the beam. A lithium niobate ($LiNbO_3$) phase modulator or FOG chip 105 is provided in a first path 104 from the output of the directional coupler, and a power monitoring photodiode 103 is provided in a second path 110 from the output of the directional coupler. A fiber loop or coil 108 with a fiber having a first 106 and second 107 end is coupled to the output of the phase modulator 105.

Light from the SLD 101 is split in the Y-junction of the phase modulator 105 and each path through the phase modulator is modulated before being applied to the first 106 and second 107 ends of the fiber loop 108 and counter-propagated through the coil. The optical signals then pass back through the phase modulator 105, are recombined in the Y-junction in the phase modulator and propagate back along path 104 to the directional coupler 102, whereby the return optical beam is then focused onto a receiving photodiode 109 where the intensity produces an electrical signal. The electrical signal is processed externally of the transceiver subassembly to compute the rotation rate of the coil 108 to provide inertial guidancy information.

Rotation in the plane of the fiber coil induces a change in the phase relationship of the two counter propagating beams, known as the Sagnac effect. The phase change may be measured as an intensity fluctuation on the receiving photodiode and further processing of the electrical signal may be used directly to determine the rotational rate of the coil. Since there is only one fiber loop and one plane, such measurement is a one-axis inertial measurement.

Figure 2:
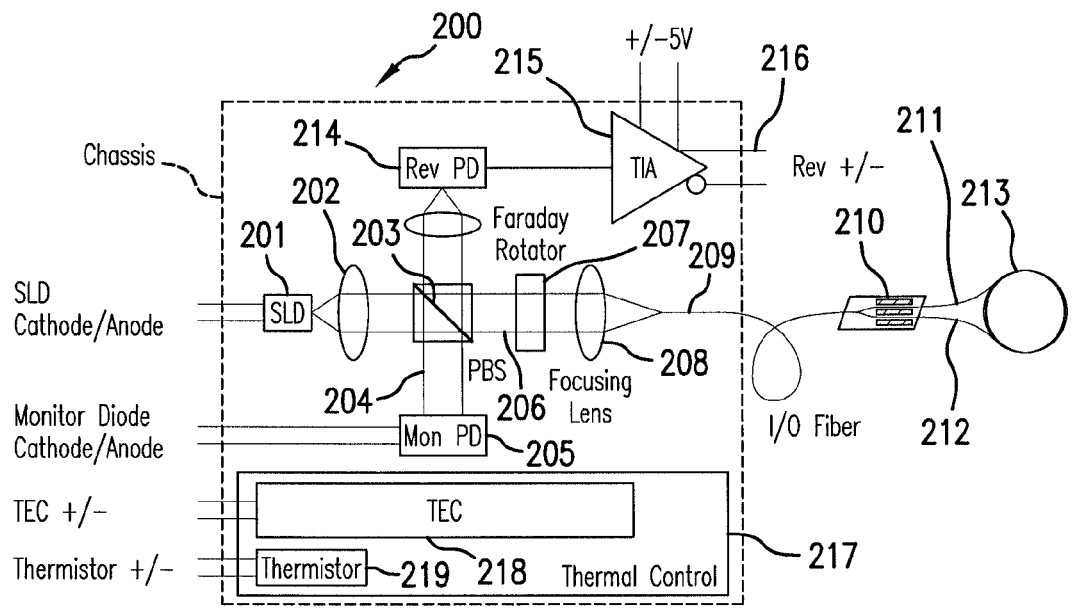
FIG. 2 is a detailed block diagram of a transceiver subassembly in a prior art single-axis fiber optic gyroscope.

FIG. 2 depicts a more detailed block diagram of a prior art single-axis FOG transceiver subassembly 200. In an effort to decrease cost, size, and parts count, the SLD 201, a collimating lens 202, an optical circulator (implemented with a polarizing beam-splitter, or PBS, 203, and a Faraday rotator 207), a receiver photodiode 214, a trans-impedance amplifier (TIA) 215, a monitor photodiode 205, and a focusing lens 208 coupled to a polarization maintaining fiber 209, are integrated into an extremely small hermetically sealed housing or package 200. One such embodiment is a commercial product known as the FOG PB3010 transceiver module manufactured by Emcore Corporation in Alhambra, Calif. Other embodiments may use other source/detector/coupler arrangements and components, including erbium doped fibers.

The subassembly 200 further includes a thermal control unit 217 including a thermal electric cooler (TEC) 218 and a thermistor 219. The TEC 218 extends over the length of the unit incorporating the SLD 201, lens 202, PBS 203, Faraday rotator 207, and focusing lens 208 so as to maintain a uniform temperature over all subcomponents.

Figure 3:
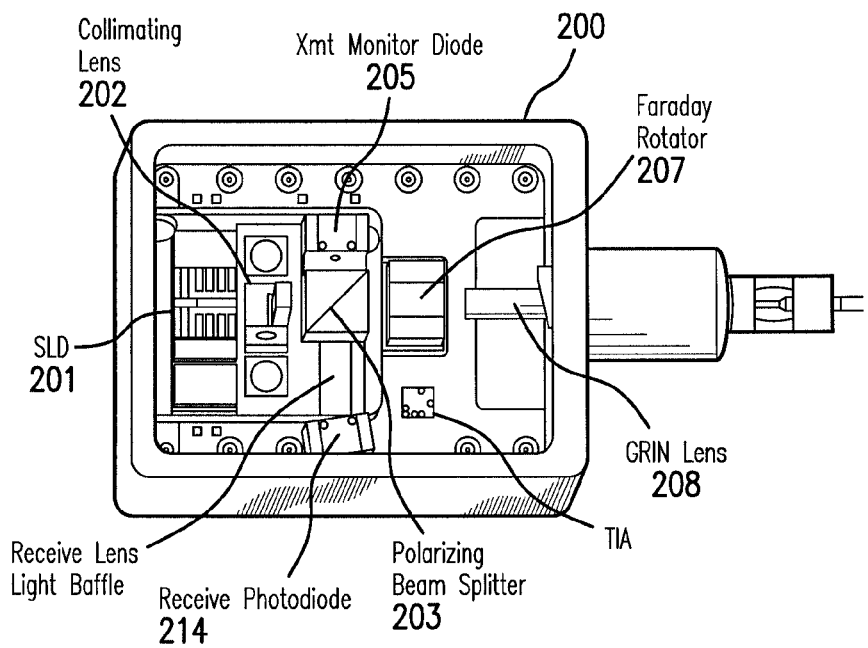
FIG. 3 is a top plan view of the transceiver subassembly in a prior art single-axis fiber optic gyroscope.

FIG. 3 is a top plan view of the prior art FOG shown in FIG. 2 with the lid of the housing removed to show the internal components. The Figure depicts the SLD 201, and a collimating lens 202 adjacent thereto. A polarizing beam-splitter or PBS 203 is disposed in the path of the beam from lens 202, and the transmitter monitor photodiode 205 located on one side of the PBS 203, and the receiver photodiode 214 located on a printed circuit board on the other side of the PBS 203. A trans-impedance amplifier (TIA) is also mounted on the printed circuit board, and is coupled to the photodiode 214 to produce the output electrical signal. The optical output beam of the PBS 203 is coupled through a Faraday rotator 207, which is in turn coupled to a GRIN lens 208 which couples to the I/O optical fiber 209 extending from the housing 200.

In the device illustrated in FIGS. 2 and 3, 96% of the optical output from the SLD 201 is in the out-of-plane polarization (S polarization) while the remaining 4% is in the in-plane polarization (P polarization). The polarizing beam splitter 203 reflects the P polarization from the SLD 201 onto the power monitoring photodiode 205 but passes the S polarization. The light then passes through the Faraday rotator 207 unaltered and is coupled at 211 into the fiber 213 with a lens 208. From this point the S polarized light travels through the rest of the fiber loop 213 until it returns at the second end 212 in the same polarization state as when it left. When the light passes through the Faraday rotator 207 in this direction (i.e. back towards the SLD 201) the polarization is rotated into the P state. The polarizing beam splitter 203 then reflects the optical return signal onto the receiving photodiode 214 that produces an electrical output directly connected to an internal TIA 215 and provides a typical gain of 10,000.

Figure 4:
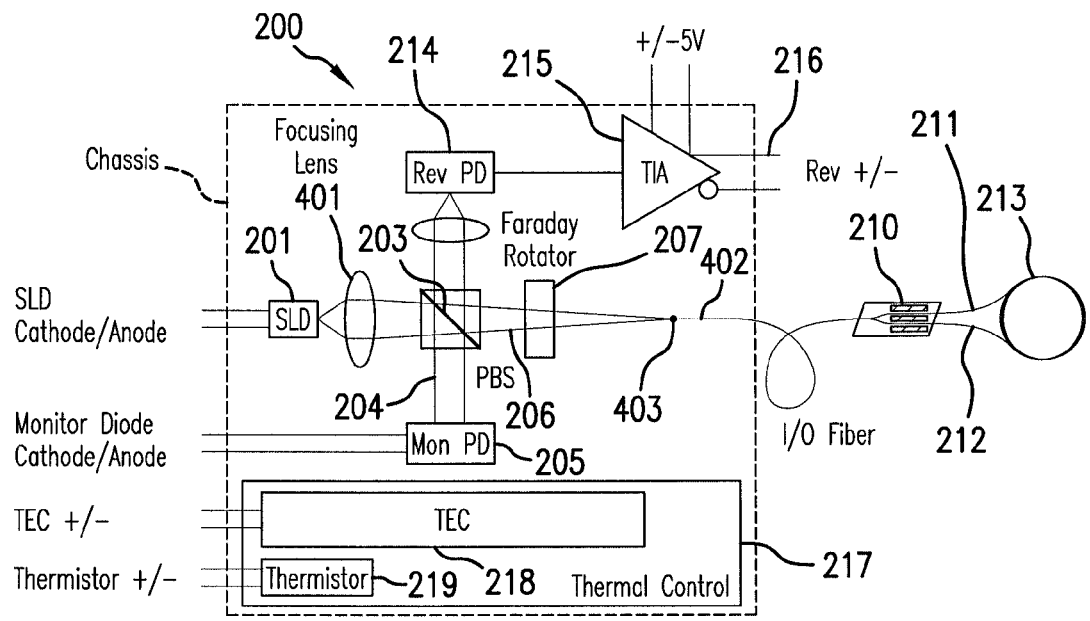
FIG. 4 is a detailed block diagram of the transceiver subassembly in a single-axis fiber optic gyroscope according to the present disclosure.

FIG. 4 is a highly simplified block diagram of a single-axis FOG transceiver subassembly 200 with a focusing lens 401 for focusing the light beam from the SLD 201 onto the optical circulator (implemented with a polarizing beam-splitter, or PBS, and a Faraday rotator 207). The focusing lens 401 is positioned in the optical path between the SLD 201 and the optical circulator instead of a collimating lens, and focuses the light beam over the optical path from the SLD 201 through the optical circulator including the Faraday rotator 207 to an optical focus point at the end 403 of the optical fiber 402 for optically coupling the light beam to the optical fiber 402 included in the FOG assembly 200. This way, the focusing lens conventionally placed in the light path between the Faraday rotator 207 and the internal fiber 402 (e.g. lens 208 in FIG. 2) and the collimating lens conventionally placed in the optical path between the SLD 201 and the optical circulator (e.g. lens 202 in FIG. 2) are excluded from the subassembly. Eliminating the lens yields a smaller form factor package and reduces cost.

The subassembly 200 further includes a thermal control unit 217 including a thermal electric cooler (TEC) 218 and a thermistor 219. The TEC 218 extends over the length of the unit incorporating the SLD 201, focusing lens 401, PBS 203, and Faraday rotator 207 so as to maintain a uniform temperature over all subcomponents.

Figure 5:
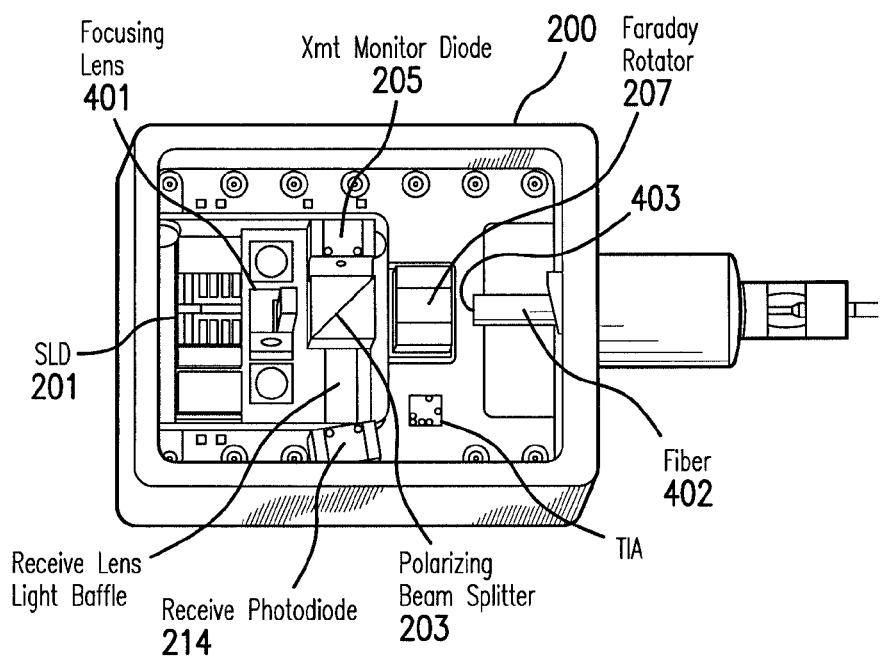
FIG. 5 is a top plan view of the transceiver subassembly in a single-axis fiber optic gyroscope according to the present disclosure.

FIG. 5 is a top plan view of the FOG assembly 200 shown in FIG. 4 with the lid of the housing removed to show the internal components. The focusing lens 401 is positioned between the SLD 201 and the optical circulator as described above. The PBS 203 component of the optical circulator is disposed in the path of the light beam from the focusing lens 401, and the transmitter monitor photodiode 205 located on one side of the PBS 203, and the receiver photodiode 214 located on a printed circuit board on the other side of the PBS 203. A trans-impedance amplifier (TIA) is mounted on the printed circuit board and coupled to the photodiode 214 for producing the output electrical signal. The optical output beam from the PBS 203 is coupled through a Faraday rotator 207, which is in turn directly coupled to internal fiber 402 which couples to the external I/O optical fiber extending from the housing 200.

Figure 6:
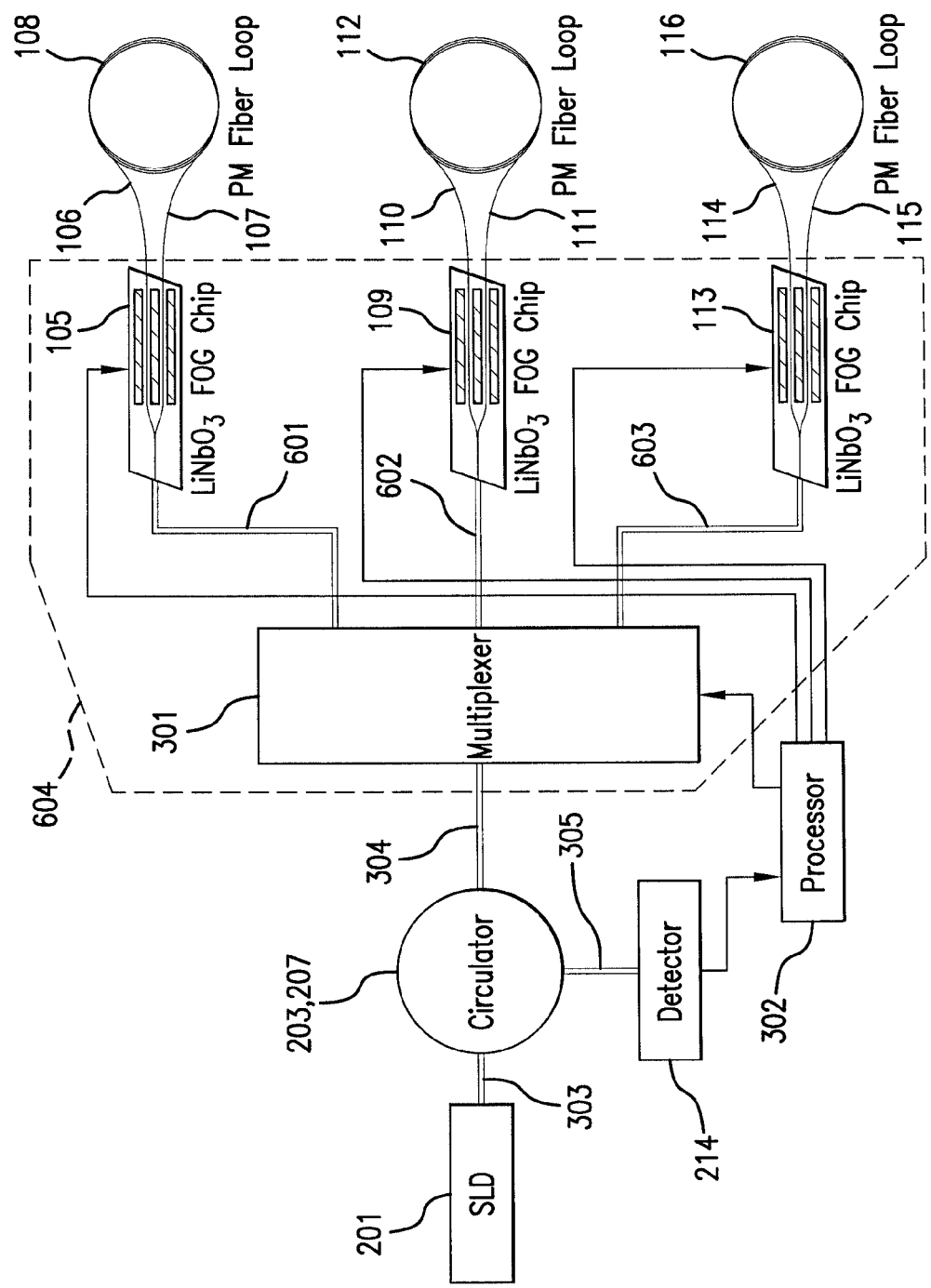
FIG. 6 is a detailed block diagram of a first embodiment of a three-axis fiber optic gyroscope according to the present disclosure.

FIG. 6 is a highly simplified block diagram of a three-axis FOG assembly. The FOG assembly includes a non-coherent SLD light source 201 for producing a first beam of light and an optical circulator 203, 207 having a first port coupled to the SLD 201 via an optical pathway 303. The optical circulator 203, 207 has a second port and a third port coupled to a polarization-maintaining optical fiber 304. The second port transmits substantially the entire first beam of light from the SLD 201 in one direction to the polarization-maintaining optical fiber 304. Light coming in the opposite direction in the polarization-maintaining fiber 304 is directed to the third port. The third port of the optical circulator 203, 207 is coupled to a photodetector 214 via an optical pathway 305. The photodetector 214 receives the incoming light and converts the light to an electrical signal.

A time division multiplexer 301 in the path of the second beam from the optical circulator 203, 207 produces a plurality of light beams at different time periods. The multiplexer 301 has at least first and second outputs for transmitting the second beam at periodic time intervals under control of a processor 302. The time periods are determined by the processor 302 at least in part based on the signal received from the detector 214 so that the FOG assembly provides precise rotational rate information.

The three-axis FOG assembly also includes at least first and second optical phase modulators 105, 109. The first modulator 105 is coupled to a first output of the time division multiplexer 301 via a first optical pathway 601. The second modulator 109 is coupled to a second output of the time division multiplexer 301 via a second optical pathway 602. In some embodiments, an optional third optical phase modulator 113 is coupled to a third output of the time division multiplexer 301 via a third optical pathway 603. Each modulator splits the respective optical beam received from the multiplexer 301 and modulates both beams.

A first planar fiber loop or coil 108 includes a fiber having a first end 106 and a second end 107 coupled to the output of the first optical phase modulator 105. A second planar fiber loop or coil 112 similarly includes a fiber having a first end 110 and a second end 111 coupled to the output of the second optical phase modulator 109. A third optional planar fiber loop or coil 116 includes a fiber having a first end 114 and a second end 115 coupled to the output of the third (optional) optical phase modulator 113.

The processor 302, based in part on feedback from the detector 214, controls operation of the multiplexer 301 so that the light beams are time multiplexed onto the fiber loops 108, 112, 116 from the different phase modulators 105, 109, 113 in a way that yields precise rotational rate information. The multiplexer 301 and phase modulators 105, 109, 113 can be fabricated on the same die or substrate to further reduce the size of the small form factor package as indicated by the dashed box labeled 604 in FIG. 6. Alternatively, the multiplexer 301 and phase modulators 105, 109, 113 can be physically separate components. The transceiver subassembly shown in FIGS. 3 and 4 may also include the multiplexer 301 and phase modulators 105, 109, 113. In one embodiment, an entire single axis FOG assembly, including one planar fiber loop, may be packaged in a single housing, such as shown and described in U.S. patent application Ser. No. 13/078,428, filed Apr. 1, 2011, and incorporated by reference.

Figure 7:
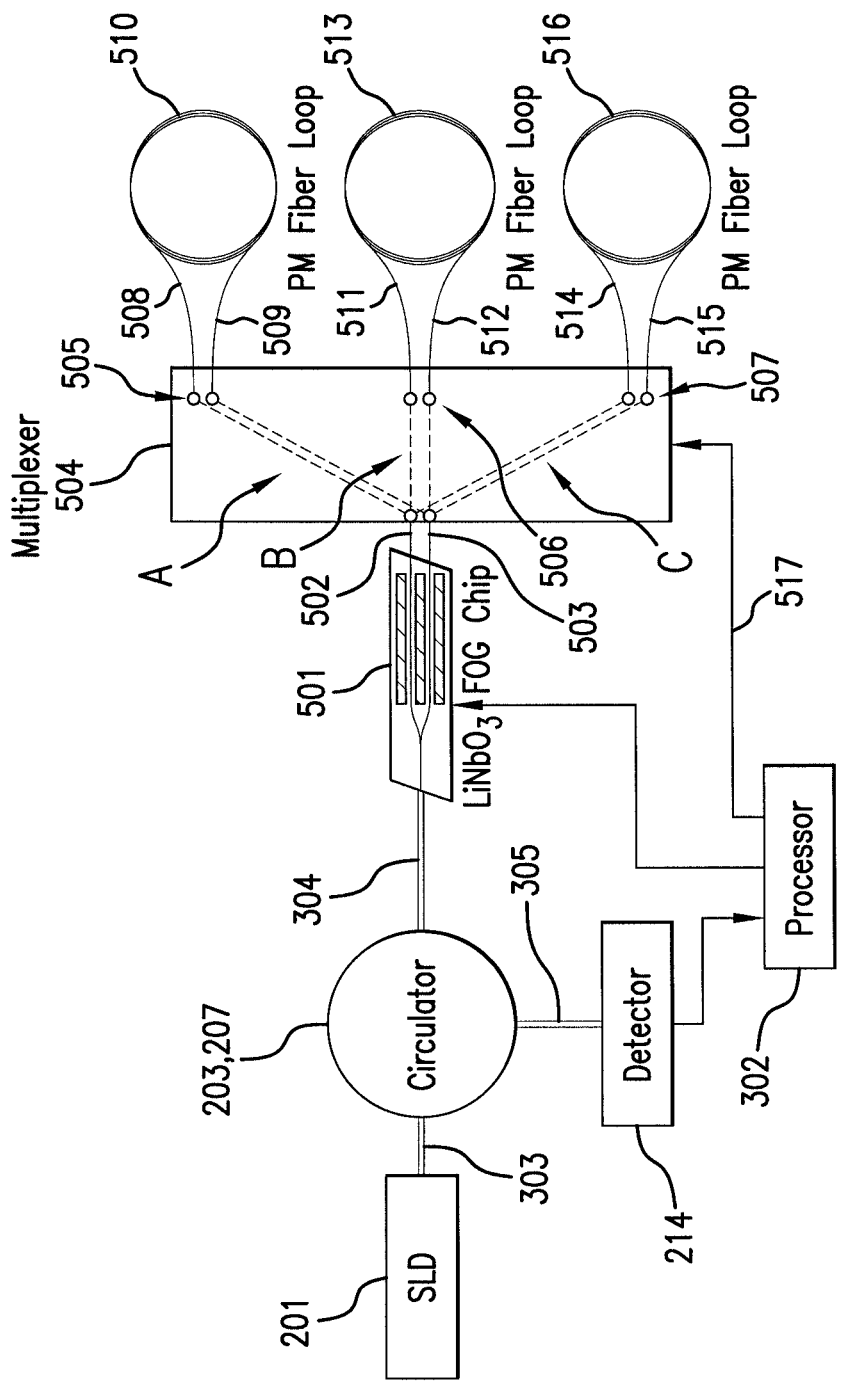
FIG. 7 is a detailed block diagram of another embodiment of a three-axis fiber optic gyroscope according to the present disclosure.

FIG. 7 is a highly simplified block diagram of another three-axis FOG subassembly. The FOG subassembly of FIG. 7 is similar to the FOG subassembly shown in FIG. 6, except a single phase modulator 501 is positioned before the multiplexer 504 instead of multiple phase modulators positioned after the multiplexer. During operation, the single phase modulator 501 splits the S Polarization light beam from the circulator 203, 207 into two light beams and modulates both beams. Each modulated light beam is input to the multiplexer 504 via respective optical pathways 502, 503. The multiplexer has at least two outputs 505, 506.

A first planar fiber loop or coil 510 includes a fiber having a first end 508 and a second end 509 coupled to the first output 505 of the multiplexer 504. A second planar fiber loop or coil 513 includes a fiber having a first end 511 and a second end 512 coupled to the second output 506 of the multiplexer 504. An optional third planar fiber loop or coil 516 includes a fiber having a first end 514 and a second end 515 coupled to an optional third output 507 of the multiplexer 504.

The processor 302, based in part on the feedback signal received from the detector 214, controls operation of the multiplexer 504 so that the modulated light beams output from the phase modulator 501 are time multiplexed over at least two different pathways A, B and optionally a third pathway C of the multiplexer 504 onto the respective fiber loops 510, 513, 516 in a way that yields precise rotational rate information.

The multiplexer 301 included in the FOG assembly shown in FIG. 6 multiplexes the S Polarization light beam from the circulator 203, 207 before the beam is split and modulated by respective phase modulators 105, 109, 113. In contrast, the multiplexer 504 included in the FOG assembly shown in FIG. 7 multiplexes the S Polarization light beam from the circulator 203, 207 after the beam is split and modulated by a single phase modulator 501. In both embodiments, rotational rate information is generated by launching modulated and time multiplexed light beams onto respective fiber loops at different time periods and measuring the corresponding response of each fiber loop.

Various modifications and improvements of the present invention may also be apparent to those of ordinary skill in the art. Thus, the particular combination of parts described and illustrated herein is intended to represent only certain embodiments of the present invention, and is not intended to serve as limitations of alternate devices within the spirit and scope of the invention.

It will be understood that each of the elements described above, or two or more together, also may find a useful application in other types of constructions differing from the types of constructions described above.

While the invention has been illustrated and described as embodied in a fiber optic gyroscope, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

What is claimed is:

1. A fiber optic gyroscope subassembly comprising:
   a non-coherent light source for producing a first beam of light;
   an optical subassembly in the path of the first beam for providing polarized second and third beams of light;
   a time division multiplexer in the path of the second and third beams;
   a first planar optical fiber loop coupled to the time division multiplexer, wherein the time division multiplexer is configured to optically couple the optical subassembly to a first end and a second end of the first planar optical fiber loop for transmitting the second and third beams to the first end and the second end, respectively, of the first planar optical fiber loop and for transmitting fourth and fifth beams of light from the first end and the second end, respectively, of the first planar optical fiber loop to the optical subassembly only during a first time period; and
   a second planar optical fiber loop coupled to the time division multiplexer, wherein the time division multiplexer is configured to optically couple the optical subassembly to a first end and a second end of the second planar optical fiber loop for transmitting the second and third beams to the first end and the second end, respectively, of the second planar optical fiber loop and for transmitting fourth and fifth beams of light from the first end and the second end, respectively, of the second planar optical fiber loop to the optical subassembly only during a second time period subsequent to the first time period.

2. A fiber optic gyroscope subassembly as defined in claim 1, further comprising a third planar optical fiber loop coupled to the time division multiplexer, wherein the time division multiplexer is configured to optically couple the optical subassembly to a first end and a second end of the third planar optical fiber loop for transmitting the second and third beams to the first end and the second end, respectively, of the third planar optical fiber loop and for transmitting fourth and fifth beams of light from the first end and the second end, respectively, of the third planar optical fiber loop to the optical subassembly only during a third time period subsequent to the second time period.

3. A fiber optic gyroscope as defined in claim 1, wherein the optical subassembly includes a polarizing beam splitter.

4. A gyroscope as defined in claim 3, wherein the optical subassembly further comprises a Faraday rotator, and wherein the polarizing beam splitter directs S polarization of the first beam from the non-coherent light source through and into the Faraday rotator.

5. A fiber optic gyroscope as defined in claim 1, further comprising a housing, and wherein the first planar optical fiber loop is circumferentially disposed around the interior periphery of the housing.

6. A gyroscope as defined in claim 3, wherein the optical subassembly further comprises a power monitoring photodetector, and wherein the polarizing beam splitter directs P polarization of the first beam from the non-coherent light source onto the power monitoring photodetector.

7. A gyroscope as defined in claim 3, wherein the optical subassembly further comprises a receive photodetector, and wherein the polarizing beam splitter directs return beams of P polarization from the time division multiplexer to the receive photodetector for thereby converting the return beams received by the receive photodetector into an electrical signal.

8. A gyroscope as defined in claim 7, further comprising a processor coupled to the receive photodetector for processing the electrical signal during the first and second time periods, respectively, to determine the rotation of the first and second planar optical fiber loops, respectively.

9. A gyroscope as defined in claim 8, wherein the processor determines the rotational rate of the first and second planar optical fiber loops with respect to first and second axes respectively.

10. A fiber optic gyroscope as defined in claim 1, wherein the optical subassembly comprise a single phase modulator coupled to the multiplexer and configured to provide the second and the third beams to the multiplexer.

11. A gyroscope as defined in claim 1, wherein the first and second time periods are of equal duration.

12. A gyroscope as defined in claim 1, wherein the first time period has a duration of less than 1 second.

13. A gyroscope as defined in claim 1, wherein the first and second planar optical fiber loops are disposed substantially orthogonal to one another.

14. A gyroscope as defined in claim 8, wherein the processor is coupled to the multiplexer so that the transition from the first time period to the second time period is synchronized with the processing of the electrical signal derived from the receive photodetector during such respective periods.

15. A gyroscope as defined in claim 1, wherein lengths of the first and second time periods are adjustable.

16. A fiber optic gyroscope subassembly comprising:
a non-coherent light source for producing a first beam of light;
an optical circulator having a first port coupled to the non-coherent light source and receiving the first beam of light, a second port, and a third port, wherein the second port is coupled to a polarization-maintaining optical fiber and transmits substantially the entire first beam of light in one direction to a polarization-maintaining optical fiber, and wherein light coming in an opposite direction in the polarization-maintaining fiber is directed to the third port;
a photodetector coupled to the third port of the circulator for receiving light from the polarization-maintaining fiber and converting the light into an electrical signal;
a time division multiplexer having an input coupled to the optical circulator for receiving the first beam of light and at least first and second outputs, wherein the multiplexer is configured to selectively couple the second port of the optical circulator to only one output of the at least first and second outputs during a single time interval over periodic time intervals;
at least first and second optical phase modulators coupled to the at least first and second outputs, respectively, of the time division multiplexer; and
at least first and second planar optical fiber loops coupled to the outputs of the first and second optical phase modulators, respectively.

* * * * *